United States Patent [19]
Taylor, Jr.

[11] 3,789,396
[45] Jan. 29, 1974

[54] RADAR APPARATUS
[75] Inventor: John W. Taylor, Jr., Baltimore, Md.
[73] Assignee: Westinghouse Electric Corporation, Pittsburgh, Pa.
[22] Filed: Mar. 6, 1972
[21] Appl. No.: 232,150

[52] U.S. Cl. .............................................. 343/5 DP
[51] Int. Cl. ............................................. G01s 9/02
[58] Field of Search ............ 343/7.3, 5 DP, 7.7, 7 A

[56] References Cited
UNITED STATES PATENTS
| | | | |
|---|---|---|---|
| 3,683,380 | 8/1972 | Catwell et al. | 343/5 DP |
| 3,419,862 | 12/1968 | Harrison et al. | 343/7.7 |
| 3,680,088 | 7/1972 | Bryant et al. | 343/5 DP |
| 3,521,277 | 7/1970 | Evans | 343/5 DP |
| 3,646,588 | 2/1972 | Popta | 343/7.3 |

*Primary Examiner*—Malcolm F. Hubler
*Attorney, Agent, or Firm*—D. Schron

[57] ABSTRACT

There is disclosed radar apparatus including a digital feedback indicator which, while including a minimum number of bits, is more precise, - for example, its precision is adequate for automatic target detection - more flexible and more stable than prior-art feedback integrators in which delay lines are used for storage elements. The apparatus includes a feedback integrating network having digital storage in which is stored, simultaneously for each range cell, a number corresponding to the echo signal newly received at any instant and decremented numbers corresponding to the echo signals previously received. The integrator is supplied with signals of a limited dynamic range to prevent the detection of non-synchronous intereference pulses, regardless of their strength. The integrator includes a top limiter which prevents the accumulation of a strong synchronous echoes to an excessive stored value, a bottom limiter which assures the receipt by the storage of at least a minimum number, and bias which sets the median of the noise in the storage near the minimum number set by the bottom limiter. Two outputs of the feedback integrator are provided: an analog voltage proportional to the stored digital number representing the integrated echo signals, and a Yes-No decision as to whether the stored digital number exceeds a predetermined digital threshold number.

18 Claims, 13 Drawing Figures

RADAR APPARATUS

BACKGROUND OF THE INVENTION

This invention relates to radar apparatus and has particular relationship to such apparatus including a feedback integrator. Radar apparatus includes a transmitter for transmitting repetitive radiation, usually periodic pulses, and a receiver for receiving the resulting pulses or echo signals reflected from targets in the region covered by the radar apparatus. Typically the apparatus operates as a moving-target-indicator (MTI) radar at short ranges where clutter is important and as normal pulse radar at longer ranges where clutter is not important. MTI is commonly implemented digitally and provides a digital number for each range cell (for each region in space illuminated by the radar beam along its range). Normal (non-MTI) receivers generally supply an analog echo which may be converted into a series of digital numbers by sampling at intervals not exceeding the range resolution. In apparatus to which this invention relates the intelligence received by the receiver is converted throughout its range into digits of numbers, usually integers and simple fractions, such as ½, ¼, ⅛, etc; the apparatus has a number of range cells corresponding to its entire range. The apparatus has conventional indicators (such as a sliding window) which may present the received intelligence categorically, answering the questions: Is there or is there not a target present? - and an oscilloscope or the like, for example, a plan-position-indicator (PPI). The receiver may include an analog-to-digial (A/D) converter to convert the analog intelligence received into digits or numbers and the indicator may include a digital-to-analog (D/A) converter to convert the digits processed by the receiver into analog intelligence for use in a PPI for example.

In radar apparatus to which this invention relates, the feedback integrator is interposed between the receiver and the indicator. An integrator is a device or circuit which provides an output based on echoes received from a multiplicity of prior transmissions; that is, on echoes received prior to the receipt of a presently incoming echo. It retains a memory of echoes received in the past, ideally weighted in accordance with the expected modulation of echoes by the scanning radar antenna. As the antenna scans a target the echo received from this target varies, or is modulated, in accordance with the directivity of the antenna: which may be visualized as a graphical lobe; for example when the lobe of the antenna is centered on the target, the maximum signal is received; when the half-power point of the beam is passing the target, only half the maximum voltage is received. Ideally the memory of the echo should be weighted to coreespond to this modulation. Such an ideal integrator is too costly, because each echo received must be stored individually to achieve an arbitrary memory characteristic.

To reduce the cost a feedback integrator has been proposed. The proposed feedback integrator uses a single storage device for each range resolution cell and is constrained to a memory characteristic which decays exponentially with time; this penalty is small compared to the cost savings. Essentially a feedback integrator inserts into its memory the latest echo received, plus a fraction (designated the feedback factor) of what had occupied that range cell of the memory before this latest data was received. The intelligence which had occupied the memory corresponding to the range cell (which is called here "range cell of the memory") is removed when the new fraction is inserted in the range-cell memory and is replaced by the new fraction. The degree to which each prior echo affects the memory can be described as an exponentially decaying memory characteristic. If the feedback factor is ⅞, the memory has a time constant of 8 interpulse periods; if 0.99, 100 interpulse periods. Correspondingly, the average noise level at the output and the time delay between peak input and peak output vary directly with the time constant.

It is essential that the feedback factor and the intelligence produced by the feedback in the integrator be precisely controlled and it is an object of this invention to achieve such precise control.

Typical of the prior art on radar apparatus with feedback integrators is the disclosure in Radar Handbook, Merrill I. Skolnik, Naval Research Laboratory, McGraw-Hill Book Company - New York, Copyright - 1970 particularly pages 17–27 through 17–31. Such prior-art radar apparatus has been found to be unsatisfactory in actual use. The PPI display is marginal in spite of the fact that the operator can compensate for some of the effects of the drifting feedback factor. For automatic target detection this radar apparatus is intolerably crude.

It is an object of this invention to overcome the above-described disadvantages of the prior art and to provide radar apparatus including a feedback integrator which shall have fully adequate PPI display and sliding-window display and shall lend itself readily to use for automatic target detection.

SUMMARY OF THE INVENTION

This invention arises from the realization that a major contributing factor to the deficiencies of prior-art radar apparatus is the employment of amplitude-modulated (AM) echo signals in the integrator feedback loop. Such signals are incapable of providing precise stable feedback factors, and the drift in the feedback factors renders even a continuously adjusted PPI display unsatisfactory, and militates against automatic target detection. The delay line commonly used in such prior-art apparatus (see Skolnik) also imposes undesirable restrictions on the interpulse period since this period must be synchronized with the period of the delay line.

In accordance with this invention, radar apparatus is provided in which the feedback integrator includes a digital storage element (core, or shift register, for example) and to which the received intelligence is supplied through an analog-to-digital converter. This A/D converter provides numbers corresponding to the echo voltage received at any instant, and the storage element receives a number corresponding to signal-plus-noise component of an echo, plus the feedback factor fraction of numbers corresponding to previously received echoes stored in the storage element. The previously stored numbers are erased from the storage element and replaced by the newly received number and the new fraction of the previously stored numbers. The storage in a core or shift register imposes no restriction in the interpulse period such as is imposed by a delay line. The echoes are sampled, at intervals less than the range resolution of the radar apparatus and converted into digital numbers. A typical range sweep is sampled several thousand times, with each sample producing an N bit number. Because of the accumulation of a multiplicity of maximum-amplitude signals in the storage it is then necessary that the core or shift register include a high number of bits, a costly requirement. For example the number of bits required are N + 3 for ⅞ feedback factor, N + 4 for 15/16 and N + 5 for 31/32. It is an object of this invention to reduce the number of bits required.

In the practice of this invention it has been found that the number of bits in the storage can be decreased by 25 percent. Typically for a feedback integrator having a feedback factor of ⅞, the number of storage bits is reduced from 9 to 6 and for a factor of 31/32 from 11 to 7.

In the practice of this invention the antenna of the radar apparatus scans the region where the targets are to be detected while repetitive radiation is transmitted into this region. Depending on the repetition rate of the radar there are transmitted a number of repetitions as the antenna scans over the beam width of its lobe. Typically this beam width is defined as the half-power one-way beam width or the half-voltage two-way beam width; that is the angle between the radii vectors of the lobe along which the echo voltage is received is one-half that which would have been received with the peak of the beam on the target. In the practice of this invention the feedback factor, is dependent on the number of transmission repetitions over the half-power beam width and ideally, for a number of repetitions $r$, is $(1-2/3r)$ Typically for 8 to 16 repetitions the feedback factor is ⅞; for 16 to 32 repetitions the factor is 15/16. The approximate numbers corresponding to a newly received echo and to progressively decremented old echoes are combined and stored simultaneously in the storage element in place of the old stored intelligence which is erased. In the interest of concreteness this discussion is limited to feedback factors which can be represented by $(1-2^{-n})$, where $n$ is an integer. This limitation provides adequate choice of characteristics and minimizes the arithmetic operations which the hardware of the computer must implement. This discussion will be concentrated on the feedback factor of ⅞, because it is applicable to the largest number of search radars, which provide 8-16 pulses as the antenna beam scnas over a target through its half-power one-way beam width.

In the practice of this invention the input to the feedback integrator is a unipolar (detected) signal in binary form. The maximum input is limited to prevent the detection of non-synchronous interference pulses, (from neighboring radars) no matter how strong.

The second condition which is imposed by the limited dynamic range of either the input or the digital storage in the feedback integrator, is that the noise level must not exceed a specified level. Either the radar receiver gain and interference environment must be sufficiently constant that noise can be held within tolerable bounds, or some receiver processing technique must be applied which can make the input to the integrator insensitive to these variables. Receivers with such processing are referred to as Constant False Alarm Rate receivers (CFAR receivers). In the interest of concreteness it is assumed that the input to the feedback integrator in the detailed description of this invention is derived from CFAR receivers.

In accordance with this invention the radar apparatus includes the following unique digital components:
1. A top limiter
2. A bottom limiter
3. Biasing means
4. A threshold These components cooperate both to minimize the number of bits required for the practice of this invention and to improve its performance.

BRIEF DESCRIPTION OF THE DRAWINGS

For a better understanding of this invention, both as to its organization and as to its method of oepration, together with additional objects and advantages thereof reference is made to the following description taken in connection with the accompanying drawings in which:

FIG. 9 is presented only for the purpose of aiding those skilled in the art in the practice of this invention and not with any intention of limiting this invention in any way.

DETAILED DESCRIPTION OF THE EMBODIMENTS

Figure 1:
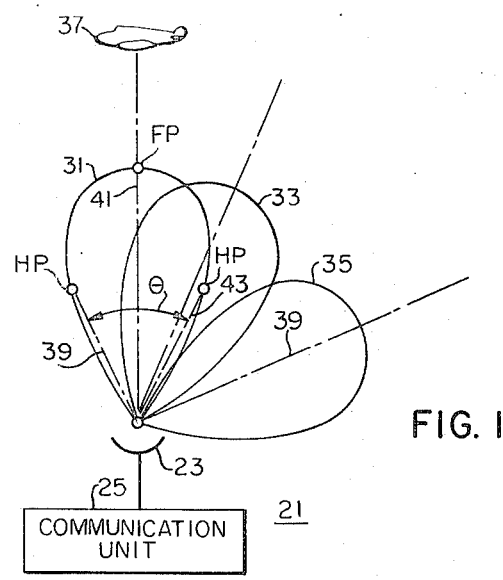
FIGS. 1 and 2 are diagrammatic views, predominately graphical, showing the manner in which radar apparatus in accordance with this invention operates.

The apparatus shown in the drawings includes radar apparatus 21 having an antenna 23 which transmits repetitive radiation generated in a communication unit 25 and receives resulting radiation reflected from targets 37 which it feeds to the communication unit for processing and indication or display. Typically the radar apparatus 21 may employ the coded pulse anti-clutter system (CPACS) one of several possible receivers which provide an essentially constant false alarm rate (CFAR) with widely varying levels of interference (noise, rain, sea clutter, chaff, etc). Where specific performance is disclosed in this application it is the performance of apparatus in accordance with this invention including a feedback integrator which processes the input from CPACS receivers. The disclosure of such performance is in the interest of concreteness and not with any intention of limiting the scope of this invenvention. The maximum input from each CPACS receiver is 13; the rms noise level is $\sqrt{13} = 3.5$; and the mean noise is approximately 3. Four channel peak selection raises the mean to approximately 5. Although the above parameters represent the input from a specific CFAR receiver configuration, they represent a fairly typical dynamic range limitation to prevent nonsynchronous interference from creating a significant output.

Typically the radar apparatus 21 operates as a moving-target-indicator (MTI) radar at the shorter ranges where the clutter is appreciable (for example, up to ranges of 40 miles). At longer ranges the apparatus 21 operates as an ordinary pulse radar, whose sensitivity is independent of target velocity.

Figure 2:
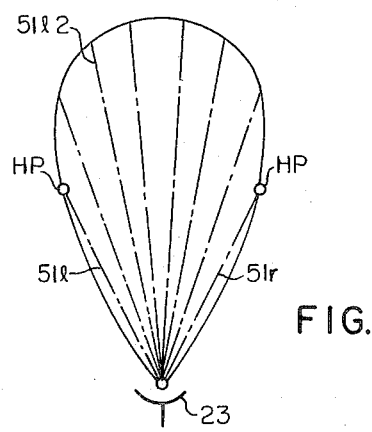

The antenna 23, which serves both transmissions of the repetitive radiation and reception of the resulting radiation reflected from targets, is directional having a reception lobe shown graphically at 31, 33, 35 for three angular positions of the antenna 23 with respect to a target 37. In each position the relative magnitude of reception of an echo of a predetermined magnitude from target 37 is plotted radially as a function of the angle of the radius vector along which the transmission takes place. The angle between the half-power radius vector (HP) 39 on one side of the radius vector 41, at which the transmission is at full or maximum power (FP), and the half-power (HP) radius vector 43 on the other side of 41 is called the half-power beam width of the antenna 23. Typically the number of repetitions of transmission of radiant energy as the antenna sweeps over its half-power beam width is between 8 and 16. FIG. 2 shows 8 radii vectors 51 which may be regarded as lined up with a target 37 as repetitions occur, while the antenna 23 is sweeping over its half-power beam width. In the practice of this invention, a fraction of the number received in one position of the antenna 23 as it sweeps is added by feedback to the number received in the next position, a fraction of the latter is added to the number received in the next position and so on. As the antenna scans the region under observation it receives perceptible echoes from target 37 at angular positions, depending on the strength of the target. If the target is strong, perceptible signals are received at angular positions corresponding to very small radii vectors of the lobe; smaller than the half-power vector; if the target is weak perceptible signals may be received only for angles near the maximum radius vector. However, in the interest of concreteness it will be assumed that as the antenna 23 sweeps across the target 37 from the lefthand half-power radius vector 51 $l$ to the righthand half-power radius vector 51$r$ (FIG. 2), an echo is received at radius vector 51$l$ ; a fraction of the number corresponding to this echo (for example ⅞) is added to the number corresponding to the echo received along the next radius vector 51/1 on the left, the fraction of this latter sum is added to the number corresponding to the echo received along the third radius vector 51/ 2 and so on. In this way the number of the overall echo is accentuated, improving the reception.

The communication unit 25 includes a transmitter 61 (FIG. 3) which supplies the power to be radiated repetitively to the antenna 23 through a duplexer 63. The echoes received by the antenna 23 are impressed on an RF amplifier 65 through the duplexer 63. The output of the amplifier 65 is converted into intermediate frequency by a mixer which is also supplied from a stable local oscillator 69. The output of the mixer 67 is supplied to an IF amplifier and filter 71. The output of the amplifier and filter 71 may follow different paths 75 and 77 depending on the intelligence desired. Along one path 75 MTI intelligence is desired for the shorter ranges where clutter may obscure echoes from moving targets; along the other path 77 the intelligence is for the lonter ranges where the apparatus 21 operates as a normal pulse radar.

Figure 3:
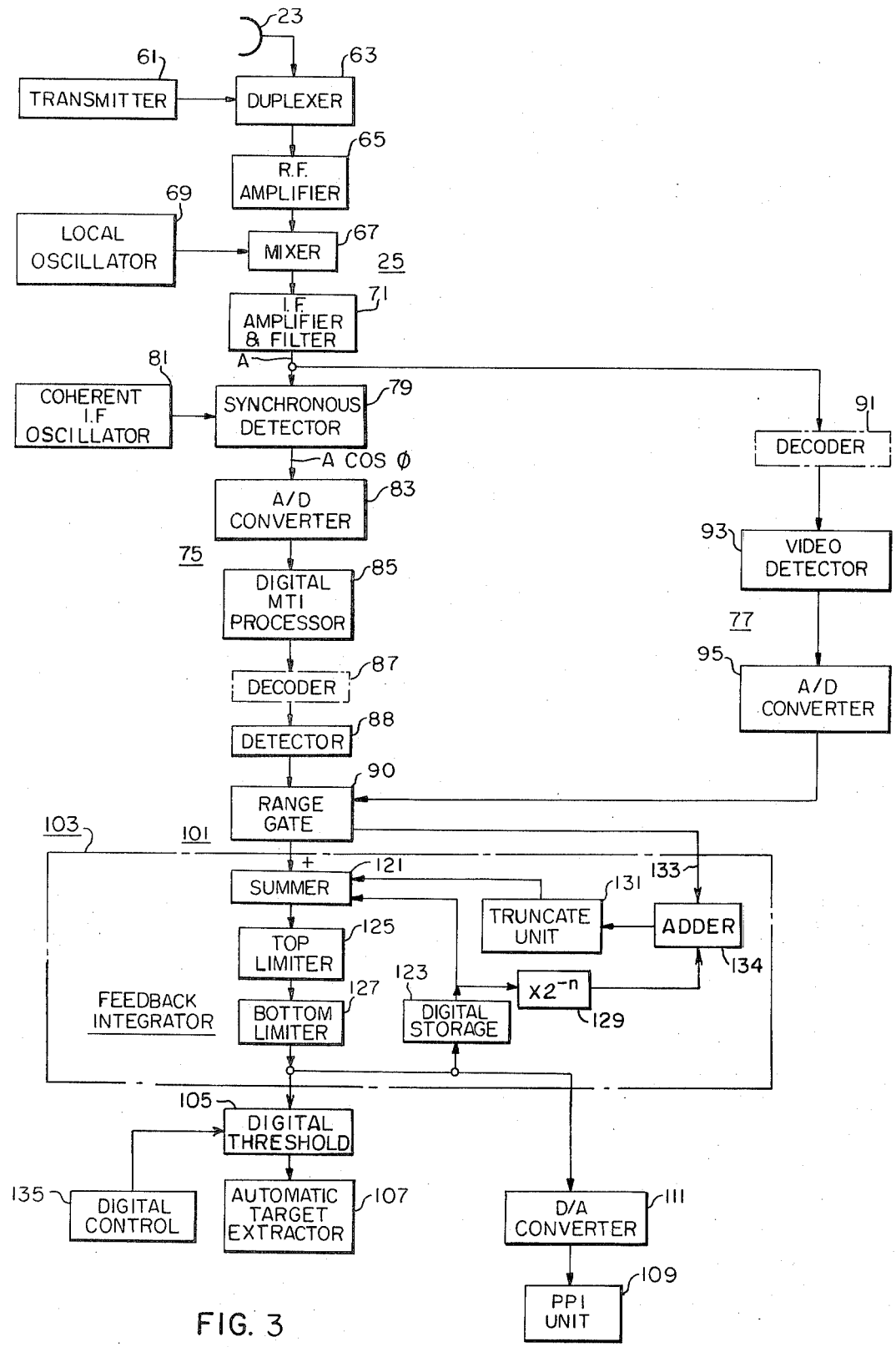
FIG. 3 is a block diagram showing apparatus in accordance with this invention as it is applied to a coded pulse anti-clutter systems (CPACS)

As indicated in FIG. 3 the output of the amplifier and filter 71 has an amplitude A. This output A is impressed on a synchronous detector 79 in path 75 which is also supplied from a phase-coherent IF oscillator 81. The output of the synchronous detector 79 may be described as $A \cos \phi$ where $\phi$ is the phase angle between transmitted and received signals, caused by the echo time delay (range of the target). A pulse-to-pulse change in phase distinguishes a moving target from a stationary one and is the basis for MTI discrimination. The output of the detector 79 is supplied to an A/D converter 83 which supplies the resulting digits to a digital MTI processor 85. Where the radar apparatus transmits coded radiation the output of the MTI 85 is supplied to a decoder 87. The output of the decoder 87 is supplied to a detector the output of which supplied range gate 90 with the MTI signal. At longer ranges the output of the amplifier and filter 71 is supplied through path 77 including in sequence a decoder 91, where necessary, a video detector 93 and an A/D converter 95. The output of the converter 95 is supplied to the range gate 90 as the normal signal.

Figure 4:
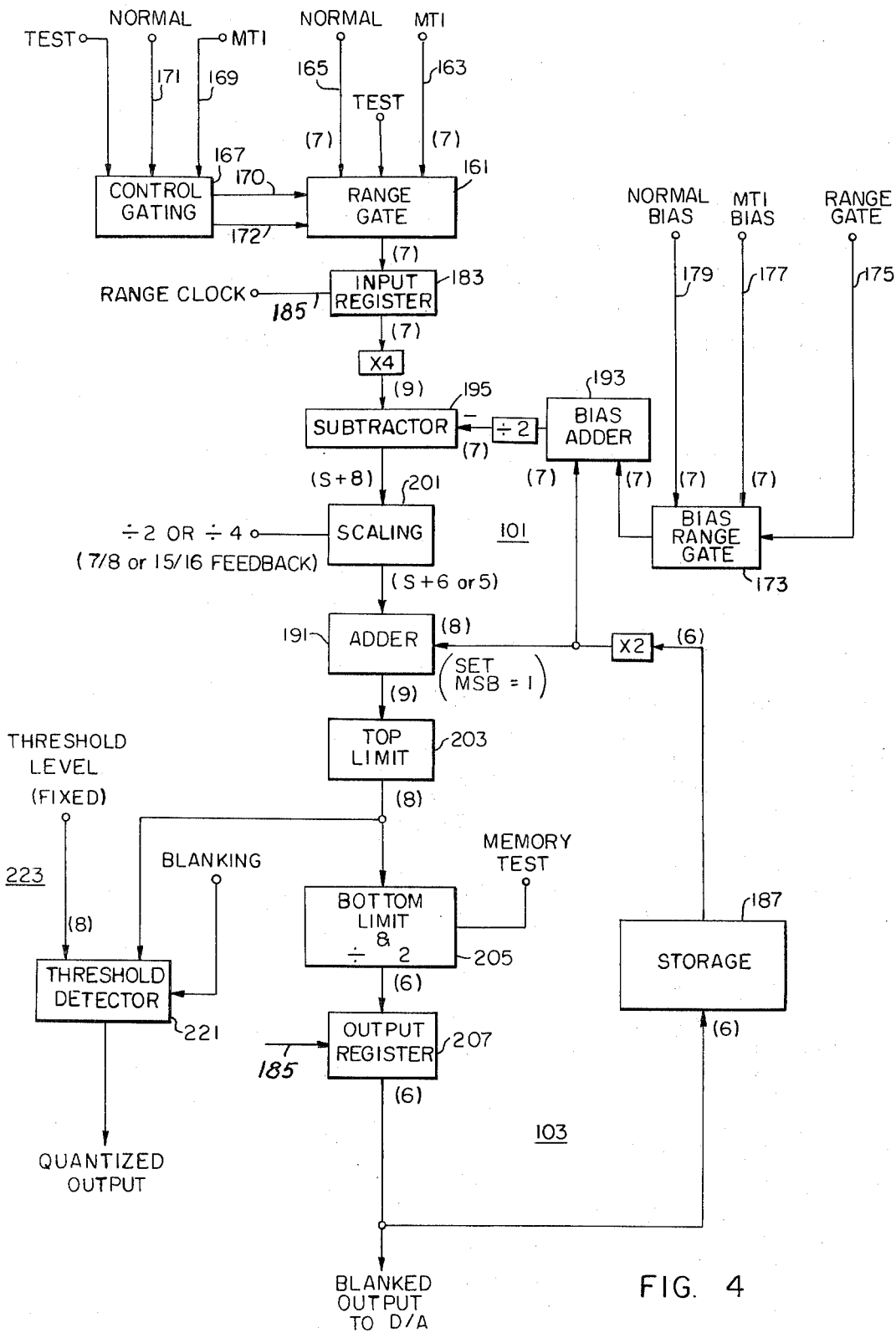
FIG. 4 is a block diagram showing in detail a processing unit for radar apparatus in accordance with this invention including a unique feedback integrator.

The outputs of the decoder 88 and the converter 95 of paths 75 and 77 respectively are processed for indication or display through a processing unit 101 including the important features of this invention. The detector 88 and the converter 95 can supply separate units 101 or share a single unit by means of the range gate 90, as shown in FIG. 3. FIG. 4 shows a processing unit in more detail; two different bias values are employed so that the two different input signals, with proper gain, will create identical noise at the output.

The processing unit 101 includes a feedback integrator 103. The output of the integrator 103 is supplied to a digital threshold 105 where the preferred indication is a Yes-No decision whether a target is present. The output of threshold 105 is supplied typically to an automatic target extractor 107. Where a PPI display with a large number of shades of gray is desired, the output of the integrator 103 supplies a PPI unit 109 through D/A converter 111.

The output of the digital threshold 105 can be displayed on a PPI, but most users find the black and white characteristics less pleasing. Likewise, automatic target extractors (107) which create a digital range and azimuth report for each detected target, can operate from the D/A output by furnishing their own analog threshold decisions.

The integrator 103 includes a summer 121 to which the outputs (new echoes) of the detector 88 or the converter 95 are supplied. The integrator 103 also includes a digital storage 123 supplied from the summer 121 through a top limiter 125 and a bottom limiter 127. The storage 123 is connected to feed back to the summer 121 the number in storage plus a negative fraction of the number in storage which is a binary fraction $2^{-n}$ where n is approximately the number of repetitions of the transmitted radiation as the antenna 23 sweeps over its half-power beam width. Typically $n$ may be 3 so that $2^{-n}$ is ⅛ and the net feedback number ⅞ where the number of repetitions over the half-power beam width of the antenna is 8 to 16. The binary fraction is derived from the stored number by shifting the storage 123, which is essentially a register, $n$ places to the right. The shift is represented by block 129. Superfluous bits are removed by the truncate unit 131. The resulting number is subtracted in the summer 121 from the newly received signal. The difference is added to the signal which is received from storage 123 by direct feed back as shown. Feedback operations take place simultaneously with the impressing of each new echo number in the summer 121 and on each operation the old numbers are erased from the storage 123. This object is accomplished by synchronizing clock pulses (185, FIGS. 4 and 9) which synchronize the transmission of echo signals, if any, from each range cell of the receiver, and the transmission of intelligence from the corresponding cell of the storage to the summer.

With the CFAR receiver furnishing a defined noise amplitude, or with other like radar bias lead 133 controls the mean noise level at the output of the integrator. The bias lead 133 and the fraction $2^{-n}$ are impressed through and adder 134. The digital threshold 105 is set to operate at a predetermined digit by a digital control 135.

Figure 5:
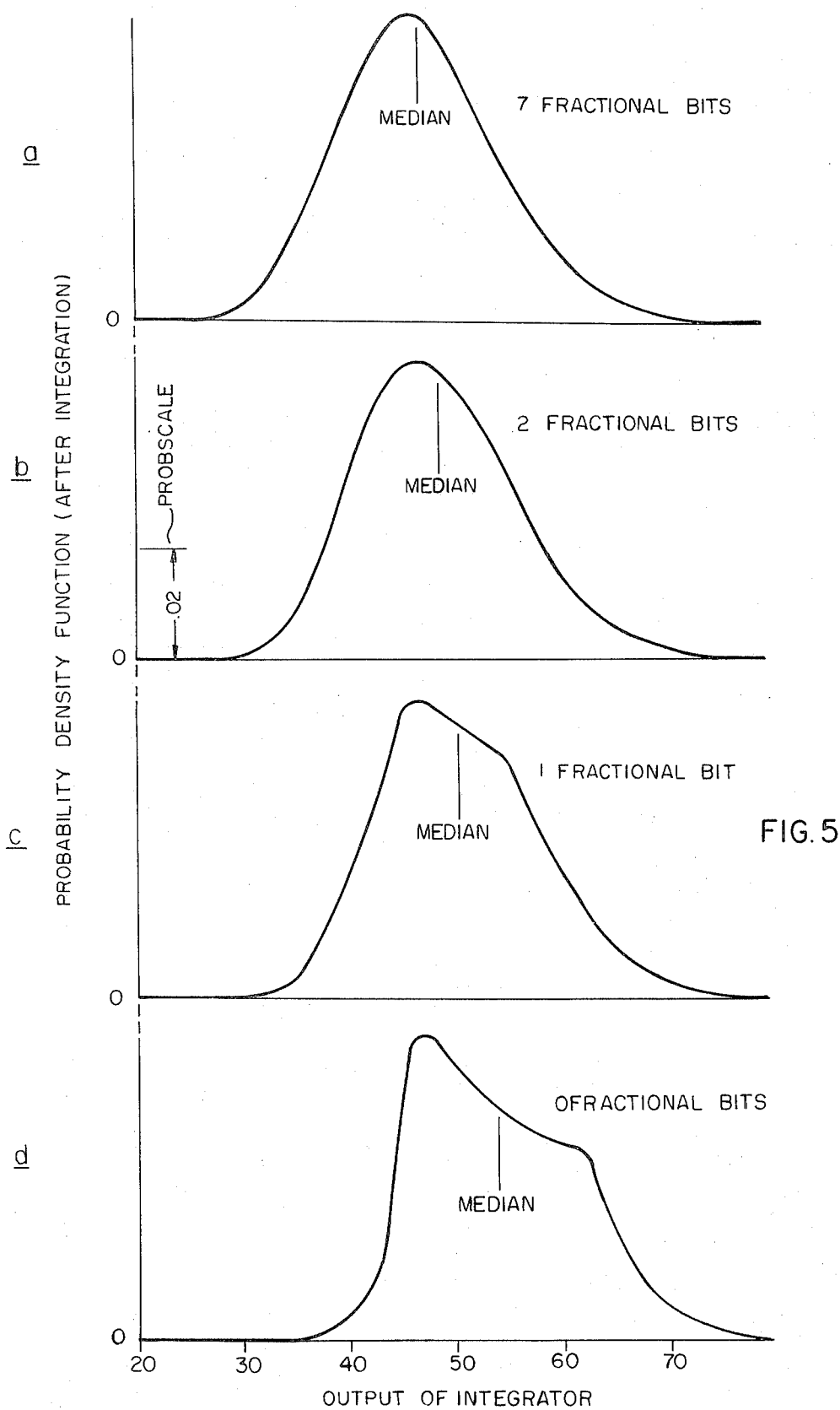
FIGS. 5a, b, c and d are graphs illustrating the effect on the probability of noise density of bits expressing fractions of integers in the practice of this invention with a single CPACS receiver.

A feature of this invention is that it defines the distortion produced by the truncation by unit 131 so that a decision can be reached as to the number of bits expressing fractions ("fractional" bits) that should be retained. This is illustrated in FIGS. 5a, b, c, d. In each view the probability of densities of noise of different levels after integration is plotted as ordinate as a function of the output of the integrator 103. The points on all curves $a, b, c$ and $d$ along the same vertical lines have the same output. The curves are plotted for an input mean noise-level of 3 (a single-channel CPACS receiver). FIG. 5d shows that if all fractional bits are truncated, the output tends to clutter around certain values (48 and 64). It is desirable to retain one, and preferably two, of these fractional bits to obtain a smooth probability distribution (FIG. 5b). Having decided to carry one or two fractional bits through the feedback loop, it is usually beneficial to accept fractional bits of input. This may be accomplished in many CFAR receivers. Fractional bits may be included as part of a binary system of numbers a 1 representing a fraction such as ½ or ¼. For example the binary expression 1000000.11 is the number 64 ¾.

Among the components which contribute important advantages to this invention are the top limiter 125, the bottom limiter 127, the bias 133 and the digital threshold 105. These components will now be discussed. The top limiter 125 prevents the integrator storage 123 from building up beyond a predetermined level, moderately above the detection threshold level. Without the top limiter 125, the output could build up to an excessive level as the antenna 23 scans past a storage target 37 or echo source, even though the input amplitude is limited. After the antenna 23 is past the target 37, considerable time is required for the output to decay back below the detection threshold. Azimuth smear, illustrated in FIG. 6b, is produced and it creates not only an abnormally wide target report but also, because of the unsymmetrical distortion, an apparent azimuth shift.

Figure 6A:
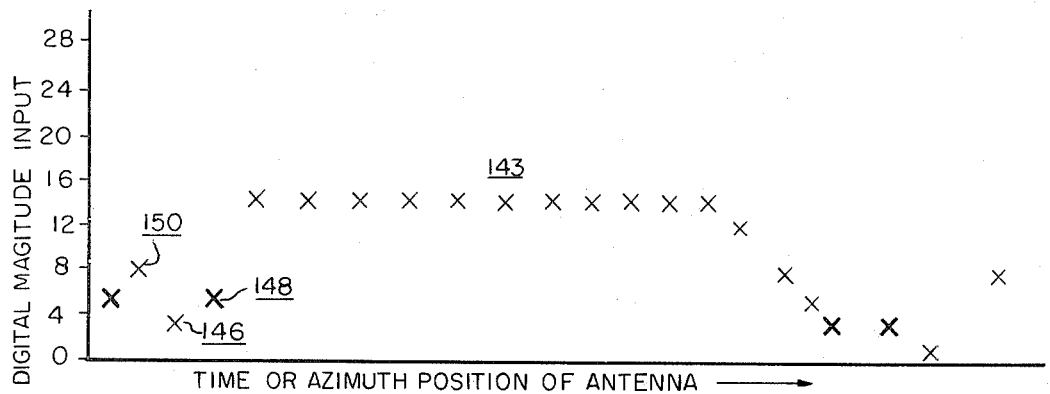
FIGS. 6a and 6b are graphs illustrating the suppression of azimuth "smear" in the received intelligence by the top limiter in the practice of this invention.

In FIG. 6a input signal strength at the feedback integrator 101 is plotted vertically in numbers as a function of time or the azimuth position of the antenna plotted as abscissa. In FIG. 6b the output signal strength corresponding to the input of FIG. 6a is plotted as a function of time or azimuth position. Points along the same vertical line correspond to the same instant of time or the same azimuth position. On the right of FIG. 6b is a scale is presented for $P_n$;

$_n$ is the probability of that noise will exceed any ordinate along the scale. The probabilities $10^{-6}$ and $10^{-4}$ are indicated along the scale.

Figure 6B:
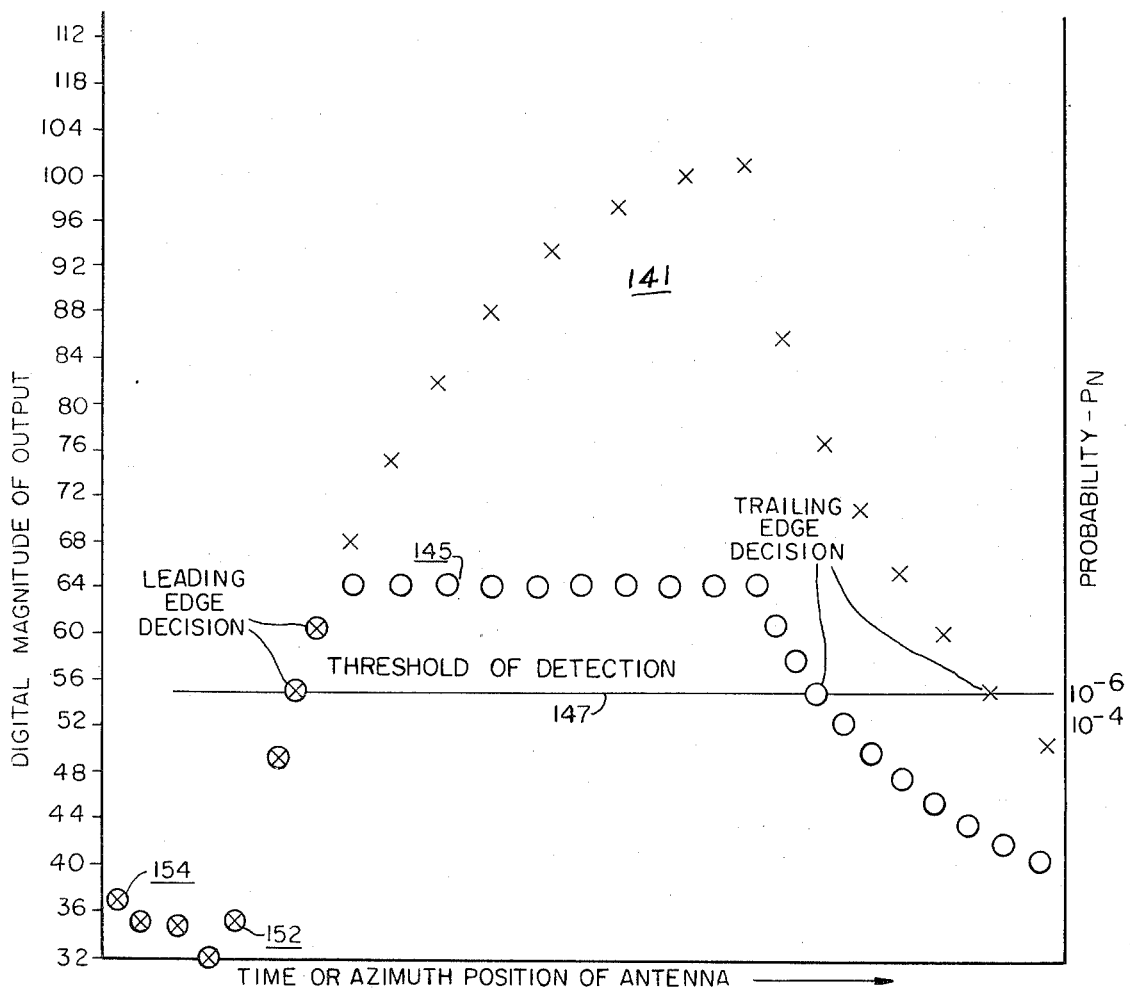

FIGS. 6a and 6b are presented as a series of points. The series 141 of FIG. 6b is the output which would be obtained in the absence of a top limiter 125 for input corresponding to curve 143 of FIG. 6a. The series 145 is the output obtained with top limiter 125. The threshold of detection is represented by line 147 at about 55. The probability $P_n$, that noise will exceed this level (55) is $10^{-6}$. The series 145 shows how the smear problem is minimized. The points labeled "Leading Edge Decision" and "Trailing Edge Decision" serve to determine the azimuth of target 37. The array of points 146, 148 and 150 in FIG. 6a represent the most probable noise inputs (3, 5, 7). The heavy points 148 indicates the mean noise level. The points 152 and 154 in FIG. 6b represent the RMS deviation from the mean.

In operation the top limiter 125 compares the output of the summer 121 with a predetermined digital number; the output of the top limiter 125 is the smaller of these two numbers. Typically a binary limit (63¾) is chosen. The choise between this limit value and the input is made solely on the basis of whether the most significant bit (MSB-64) of the input from the summer 121 is 1 or 0. The binary top limit is advantageous in that it eliminates one bit for each input signal from the storage and subsequent operations.

Figure 7:
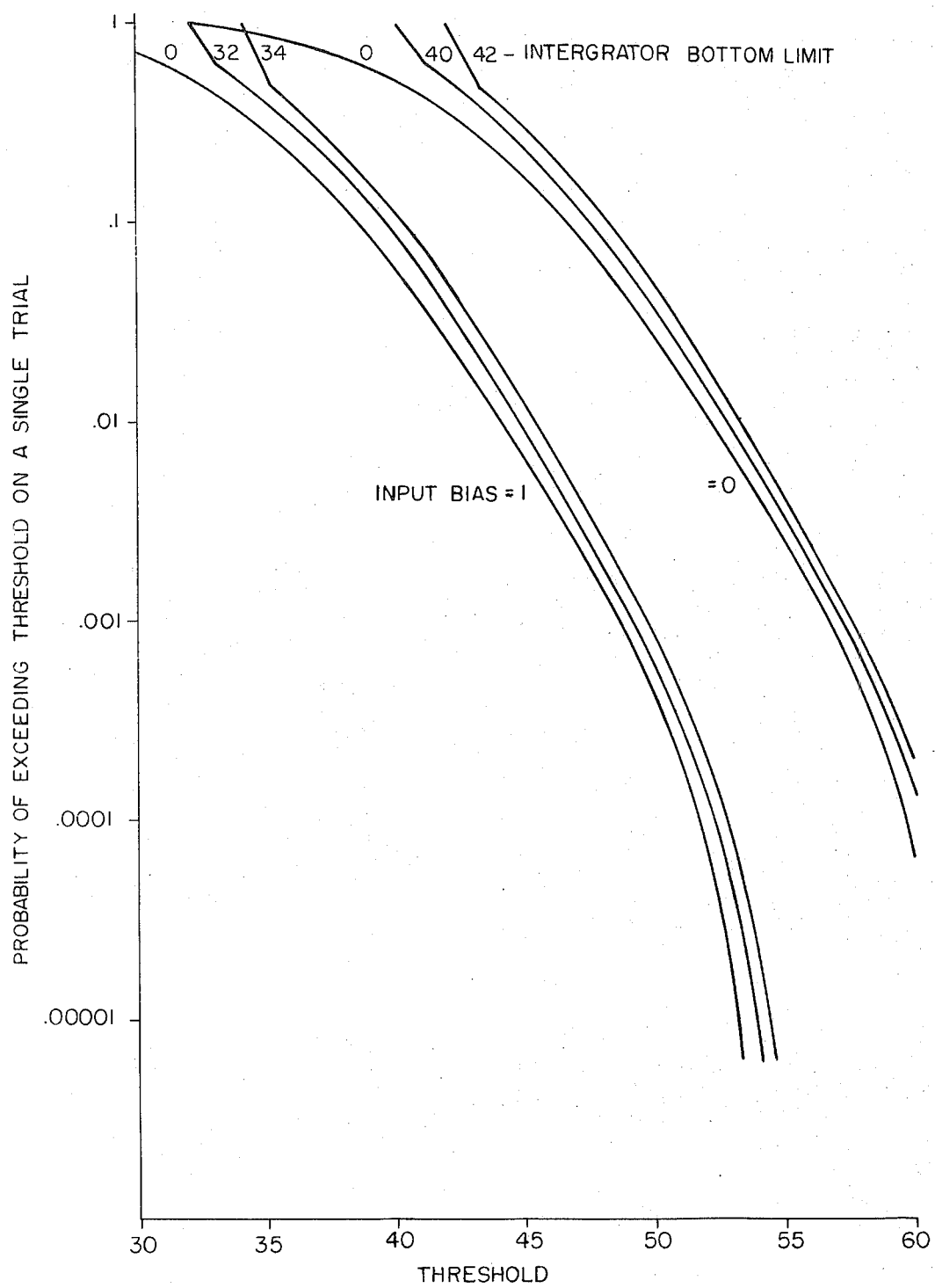
FIG. 7 is a graph showing the effects of the bias and the bottom limiter in the practice of this invention with four CPACS receivers peak selected.
Figure 8:
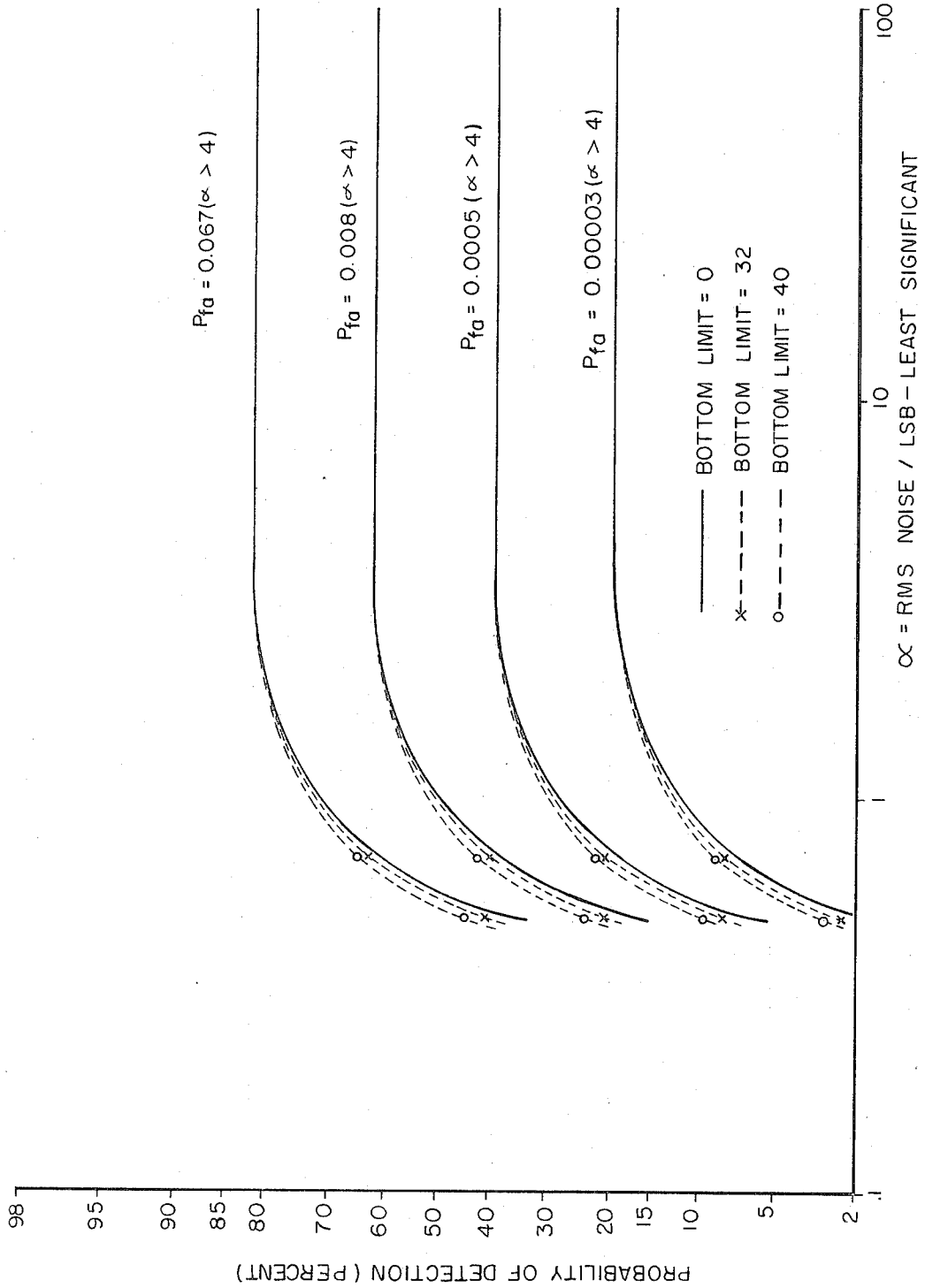
FIG. 8 is a graph showing the effect of different bottom limits in the practice of this invention with four CPACS receivers peak selected.
Figure 9:
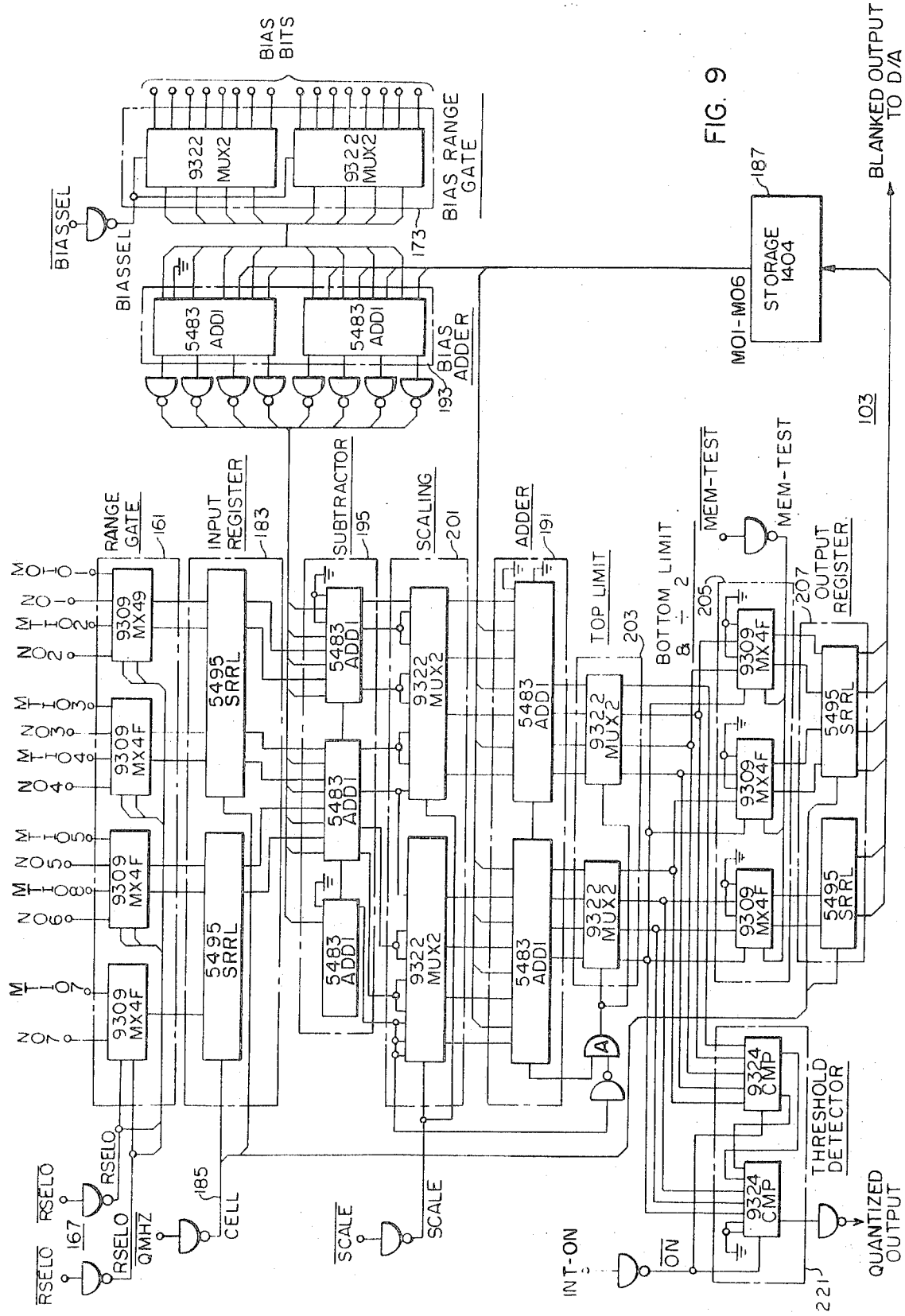
FIG. 9 is a schematic showing the components and the relationship of the components of a processing unit such as is shown in FIG. 4, with four CPACS receivers peak selected, which is used in the actual practice of this invention and their relationship.

The bottom limiter 127 prevente the numbers stored in the storage 123 from falling below a predetermined level, which is typically in the vicinity of the usual median noise level. Without the bottom limiter 127, Sensitivity Time Control (STC) causes the noise to disappear at close range and the integrator output to fall to zero. Having only a few pulses available as the radar beam scans the target 37, whose maximum amplitude is limited and which fade due to MTI processing (particularly when only one component of the echo vector is processed), it is difficult to biuld up from zero to the detection threshold. The bottom limiter 127 provides a floor under the normal noise level, to prevent this condition from occurring. FIGS. 7, 8 and 9 show the effect of the bottom limiter.

In FIG. 7 threshold is plotted as abscissa in numbers; probability that noise will exceed threshold is plotted as ordinate. Essentially the ordinate is the probability of a false alarm or false echo. The curve is derived from a radar having four receive beams, stacked in elevation, with a 3 pulse MTI and CPACS decoder in each receiver. The largest of the four input signals is selected. At the feedback integrator 103 the feedback factor is ⅞, the RMS noise is equal to the least significant bit at the A/D converter. $P_n$ of FIG. 6 is derived from FIG. 7, $P_n$ corresponding to the probabilities of FIG. 7. (Note that in FIG. 7 the probability is $10^{-4}$ at a threshold of 52 for a bottom limit of 32 and a bias of 1; compare with FIG. 6).

FIG. 7 shows two sets of curves: one set at 0 bias and the other set at a bias of 1 supplied by bias 133. The respective bottom limits are indicated on the curves. The effect of the bias of 1 is to displace the curves so that the noise at the same threshold is lower without substantially changing the shapes of the curves.

In FIG. 8 Probability of detection in percent is plotted as ordinate against a function $\alpha$ which is equal to the RMS noise divided by the least significant bit at the A/D converter. FIG. 8 is plotted like FIG. 7 for 3 Pulse MTI, CPACS Decoder with 4-channel peak select and the feedback integrator 103 operating with a feedback factor of 7/8. There are 13.33 bits per half-power beam width. Detection is defined when 4 signals out of 11 exceed the threshold. The bias supplied by bias 133 is 1, the signal-to-noise ratio is 0 DB (1) at the A/D converter. Even with the 13.33 hits per beam width, the benefits of a bottom limit are significant, but they become more dramatic as the number of bits decrease. Four sets of curves are presented for different probabilities of false alarm designated $P_{fa}$. In each case the probability of detection is a constant level for high noise but drops as noise is reduced to usual receiver noise level (1). Each set of curves includes three separate curves for 0, 32, and 40 bottom limits. An improvement in probability of detection is shown for an increase in the bottom limit.

The bottom limiter 127 compares the input (from the preceding top limiter 125) with a predetermined digital number; the output of the bottom limiter 127 is the larger of these two numbers. In its simplest form of implementation, a binary limit (32) is chosen. The choice between this limit value and the input is made solely on the basis of whether the MSB (32) of the input is 0 or 1. The more general form of bottom limiter involves a subtraction of the two numbers, with the polarity of the result determining which to choose for the output. If the bottom limit exceeds half of the binary top limit, another bit is saved in the memory. Since the bottom limit ensures that the MSB (32) will always be 1, it may be fix-wired; no electronic memory is required for this bit.

Another advantage of the bottom limit is that it provides a definite bottom to the analog output. Most circuitry for transmission and display of radar video utilize AC amplification with DC restoration; in the absence of a dependable bottom this circuitry would react poorly.

To exploit the advantages of the optimum top and bottom limits, binary values, it is necessary to shift the median noise level so that it is near to the bottom limit. This is the purpose of the bias 133, which can be predetermined digital number added or substracted at any one of a variety of points; one possibility is shown in FIG. 3 where the bias is impressed on the summer 121. In the four channel example used in producing the graphs, a bias of −1 is optimum for a 32 bottom limit. For a single channel system, a bias of +1 would be appropriate. FIG. 7 shows how the bias of 1 shifts the probability of false alarm to lower magnitudes for a threshold of about 54.

A digital threshold 105 instead of the usual analog variety, eliminates a host of interface problems with digital target extractors. Inaccuracies of D/A converters and the inevitable problems of hum and other interference on coaxial cables are avoided. Time jitter between the clock of the digital radar receiver and that of the user (Common Digitizer AN/FYQ-49, for example) can be made tolerable by the device. The first function of the digital threshold 105 is to determine which of two digital numbers is larger. The process is the same as described for the bottom limiter 127, but the output is only the decision, one bit. In other words, is or is not the threshold exceeded? The second function is to ensure that a report from any range cell of the radar is consistently reported in the corresponding cell of the Common Digitizer. No reports should be generated near the edges of the latter's cell, because time jitter could then split the reports, sacrificing resolution and detectability.

As an example, assume the radar provides one twenty-fourth nautical mile (NM) (that is, range cells at intervals of one twenty-fourth NM) range cells, while the Common Digitizer accepts only one-eighth NM increments. The digital threshold 105 makes three decisions, on three adjacent range cells. If any one of the three decisions results in a 1, a one twenty-fourth NM pulse is generated, centered in the one-eighth NM acceptance period of the Common Digitizer. In this fashion, all boundary decisions are shifted to the center of the closest one-eighth NM cell and as much as ± one twenty-fourth NM time jitter can be tolerated between the clocks of the radar and Common Digitizer.

In FIG. 4, the number of bits (per range cell) at each step in a typical situation are shown in parentheses. Notations indicate bits added or dropped. The letter S denotes a bit used for positive or negative polarity (sign).

As shown in FIG. 4 the echo signals are derived from a range gate 161 into which the inputs flow along the line 163 labeled MTI for MTI ranges and along the line 165 labeled NORMAL for longer ranges (each 7 bits). The range gate 161 is correspondingly controlled from the control gating 167 whose operation is determined by lines 169 and 171. The control gating 167 provides two output control lines 170 and 172 which can switch between the three (or sometimes four) input signals to range gate 161. One of these control lines controls the bias range gate through line 175. The bias is supplied through a bias range gate 173 which is controlled through line 175 and selects from lines 177 and 179, respectively: MTI bias or normal bias depending on the range of the target.

The range gate 161 supplies an input register 183 which is synchronized from the range clock (not shown) through conductor 185. The input register 183 supplies the feedback integrator 103. This integrator 103 includes a storage 187 which is a shift register memory comprising 6 bit words. Effectively each stored word is 7 bits; the MSB (32) is always 1. For a range of 200 nautical miles, which is typical, and 24 cells per mile there would be 4800 range cells or stored words. The Intel chip 1404 (see FIG. 9) has 1024 bits per chip. Five sets of six chips would be required. The storage 187 is connected to an adder 191 and through a bias adder 193, which adds the bias selected in the bias range gate 173, to a subtractor 195. The 6 bits from the storage 187 plus a fix-wired most significant bit provide 7 bits onto the subtractor 195 through the bias 193. The addition of the 7-bit word from storage and a 7-bit word from bias produces an 8 bit word but this is reduced to a 7-bit word into the subtractor by truncation, division by 2. The subtractor feeds into the adder 191 through scaling 201 which divides the number supplied by 2 (LSB dropped) for feedback factor 7/8 and by 4

(LSB and next one on right dropped) for feedback factor 15/16. The feedback number is divided by 4 in the remainder of the feedback loop.

The adder 191 receives the 6 bit feedback signal from the storage 187 but adds a MSB=1 and a LSB=0 so that there are 8 bits. Thus a full 8 bit number is inserted in the adder 191. The adder 191 adds a bit for the addition so that there are 9. The output of the adder 191 passed through the top limit 203 which removes 1 bit; the output of the top limit passes to the bottom limit 205 which removes one bit. The number on the bottom limit drops its LSB (one of the two fractional bits) so that 6 bits pass to the output register 207 and to the storage 187.

The addition of MSB=1 in the adder 191 inserts the bottom limit at this point rather than storing it in the storage 187. Typically if the bottom limit is 32, and if memory contains one fractional bit, the 6 bits out of the storage are less than 32, for example 11111.1 = 3½. Addition of MSB gives the number 63½. The addition of LSB=0 replaces the bit removed in the bottom limit 205.

The output of the output register 207 is supplied through a D/A converter to the PPI. The output of the top limit 203 is supplied to a threshold detector 221; the threshold level is set through conductor 223.

While 6 × 4800 bits are required in the digital storage 187 the remainder of the processing unit 101 requires only the number of bits indicated. The reason for this difference between the storage 187 and the other components of the processing unit 101 such as the top limit 203, bottom limit 205 etc is that the data is stored at the same instant in the storage while it passes sequentially through the remainder of the processing unit 101. As shown in FIG. 4 the positive feedback loop has unity gain = (÷ 2) × (x2) and the negative feedback loop has a gain of either one-eighth or one-sixteenth = (÷ 2) × (÷ 2) × (÷ 2 or ÷ 4).

FIG. 9 shows a processing unit (101 FIG. 3) used in the actual practice of this invention; the blocks labeled by "9,000" numbers and "5,400" numbers are integrated circuits, or monolithic unit or "chips," as they are sometimes called. The "9,000" designations are the numbers under which the identified integrated circuits are bought from Fairchild semiconductor, a division of Fairchild Camera & Instrument Co.; the 5,400 designations are the numbers under which the identified integrated circuits are bought from Texas Instrument Co. The storage (123 FIG. 3) in FIG. 10 is a printed circuit containing an array (6 × 5) of "chips" bought from Intel Corp. under the number 1404. The designations under the part numbers are functional identifiers; for example:

ADD1 means an adder
MUX2 means a selector between two inputs
MX4F means a selector between four inputs
CMP means a comparer between two inputs
Do means an inverter, converting an input from 1 to 0 or from 0 to 1.

The inverter and the AND on the left are included because the operation of the top limit would be inhibited if the sign is negative. The AND operates to pass the inverter signal if the output of the ADDER (181, FIG. 4) is negative. The operation may take place in the ADDER (181, FIG. 4) if there are enough bits.

This invention in unique radar apparatus including a digital feedback integrator with a number of novel features which are coordinated to allow two bits to be saved in the memory (for each of several thousand range cells). A corresponding saving in subsequent processing ---- by D/A converters or digital thresholds, for example ---- is achieved. These features not only reduce cost but improve performance, preventing strong targets from creating unnecessary aximuth smear and preventing STC from unnecessarily degrading detectability. It has been verified that, under no conditions do these features penalize detectability. Their benefits entail no sacrifices. Another novel feature, the ditigal threshold (105, FIG. 3; 221, FIG. 4), improves the interface between the integrator and a user of its data, another digital processor typified by the Common Digitizer, AN/FYQ-49. It makes the interface tolerant of hum, timing jitter, and other sources of possible performance degradation.

While preferred embodiments of this invention have been disclosed herein, many modifications thereof are feasible. This invention then is not to be restricted except insofar as is necessitated by the sqirit of the prior art.

I claim as my invention:

1. Radar apparatus for detecting targets including means for transmitting repetitive radiation, receiver means for receiving resulting radiation reflected from said targets as echo signals, if any, at different ranges, analog-to-digital converter means connected to said receiver means for converting each of said echo signals into digital numbers dependent on the magnitude of the echo signals, an integrating feedback network including digital storage means, means connected to said analog-to-digital converter means for supplying the said integrating feedback network a digital number derived from each echo signal received at any instant, and corresponding to the echo voltage of said last-named signal, said digital storage means being connected in feedback relationship in said integrating feedback network to receive at any instant one of said last-named digital numbers plus a decremented digital number derived from, and corresponding to, the echo signals received at the range corresponding to said instant in the past, each said decremented number constituting a predetermined fraction of a previous such number stored in said storage means, starting with the first numbers derived from, and corresponding to, each echo signal in said storage means, said storage means on the receipt of a decremented number of any echo signal removing the number from which said last-named decremented number is decremented, indicator means and means connected to said integrating feedback network and said indicator means for producing on said indicator means a manifestation of the output of said feedback network.

2. The apparatus of claim 1 wherein the digital storage means is supplied with the digital numbers through a top limiter which limits the numbers supplied to the storage means to a predetermined upper limit.

3. The apparatus of claim 2 wherein the top limiter is interposed in the feedback integrator in limiting relationship to the storage to limit the sum of the numbers corresponding to initial echoes and the decremented numbers.

4. The apparatus of claim 1 wherein the digital storage means is supplied with the digital numbers through a bottom limiter which impresses at least a predetermined minimum number on the storage means when the said digital numbers are less than said minimum number.

5. The apparatus of claim 4 including biasing means for setting the level of the digital numbers transmitted at a level such that the median level of the noise in said storage means is near the predetermined bottom limit.

6. The apparatus of claim 4 wherein the most significant bit set by the bottom limiter for each range cell is permanently wired in the apparatus.

7. The apparatus of claim 1 wherein the feedback network output manifestation producing means includes digital threshold means for producing a manifestation only for numbers received from the feedback network which exceed a threshold number.

8. The apparatus of claim 1 including synchronizing means for synchronizing the receiving means and the integrated feedback network so that the feedback of each decremented number from the storage means and the impressing of each number derived from each new echo takes place simultaneously.

9. The apparatus of claim 1 including a top limiter and a bottom limiter both interposed in the feedback integrator, both the numbers corresponding to the initial echo signals and the decremented numbers being supplied to the storage means through said top and bottom limiters, the top limiter limiting the sum of all said numbers to a predetermined upper limit and the bottom limiter impressing at least a predetermined number in said storage means.

10. The apparatus of claim 1 wherein the digital numbers derived from an echo and the decremented digital numbers are stored in bits in the storage means, the bits including for each echo and the decremented digital numbers derived from said echo at least one bit for storing a fractional number.

11. The apparatus of claim 1 including biasing means for setting the digital numbers transmitted at a level such that the noise is at a predetermined median level.

12. Radar apparatus according to claim 11 including MTI radar means and normal pulses radar means and means for setting the apparatus to operate as MTI radar at short ranges in the presence of clutter and as normal pulse radar at longer ranges in the absence of clutter, and means responsive to the setting means for automatically setting the bias to correspond to the setting of the operation of the apparatus.

13. The apparatus of claim 1 wherein the digital storage means is supplied with digital numbers through a top limiter which limits the numbers supplied to said storage means to a predetermined upper limit, the output manifestation producing means of said apparatus also including digital threshold means for producing a manifestation only for numbers which exceed a threshold number, the threshold means being connected to receive the output of the top limiter.

14. Radar apparatus for detecting targets including means for transmitting repetitive radiation, receiver means for receiving resulting radiation reflected from said targets as echo signals, if any, at different ranges, analog-to-digital converter means connected to said receiver means for converting each of said echo signals into digital numbers dependent on the magnitude of the echo signals, an integrating feedback network including digital storage means, means connected to said analog-to-digital converter means for supplying the said integrating feedback network a digital number derived from each echo signal received at any instant, said digital storage means being connected in feedback relationship in said integrating feedback network to receive at any instant one of said digital numbers plus a decremented digital number derived from the echo signals received at the range corresponding to said instant in the past, each said decremented number constituting a predetermined fraction of a previous such number stored in said storage means, starting with the first numbers derived from each echo signal in said storage means, said storage means on the receipt of a decremented number of any echo signal removing the number from which said last-named decremented number is decremented, indicator means and means connected to said integrating feedback network and said indicator means for producing on said indicator means a manifestation of the output of said feedback network, the said integrating feedback network including:
  a. a summer, and
  b. means for supplying to said summer at any instant a first digital number derived from said echo signal received at said instant, second digital numbers corresponding to decremented digital numbers stored in the storage from echo signals received in the past, and third digital numbers each corresponding to a proper fraction of a said decremented digital number, said summer adding said first and second numbers and subtracting said third numbers.

15. Radar apparatus for detecting targets including means for transmitting repetitive radiation, receiver means for receiving resulting radiation reflected from said targets as echo signals, if any, at different ranges, analog-to-digital converter means connected to said receiver means for converting each of said echo signals into digital numbers dependent on the magnitude of the echo signals, an integrating feedback network including digital storage means, means connected to said analog-to-digital converter means for supplying the said integrating feedback network a digital number derived from each echo signal received at any instant, said digital storage means being connected in feedback relationship in said integrating feedback network to receive at any instant one of said digital numbers plus a decremented digital number derived from the echo signal received at the range corresponding to said instant in the past, each said decremented number constituting a predetermined fraction of a previous such number stored in said storage means, starting with the first numbers derived from each echo signal in said storage means, said storage means on the receipt of a decremented number of any echo signal removing the number from which said last-named decremented number is decremented, indicator means and means connected to said integrating feedback network and said indicator means for producing on said indicator means a manifestation of the output of said feedback network, the said integrating feedback network including:
  a. a summer, and
  b. means for supplying to said summer at any instant a first digital number derived from said echo signal received at said instant, second digital numbers corresponding to decremented digital numbers stored in the storage from echo signals received in the past, and thirty digital numbers each corresponding to a said decremented digital number divided by $2^{+n}$, where n is an integer, said summer adding said first and second numbers and subtracting said third numbers.

16. The apparatus of claim 15, wherein the radar apparatus has an antenna which sweeps the region of the targets and wherein the integer n approximates the number of incidences of repetitive radiation emitted by said antenna as said antenna sweeps over its beam width.

17. The apparatus of claim 16 wherein the beam width is the half-power beam width of the antenna.

18. The apparatus of claim 16 including synchronizing means for synchronizing the transmitting means, the receiver means and the integrating feedback network so that on each repetition, the feedback of each decremented number, corresponding to the echo signals received for the target in the past, from the storage means and the impressing of a number corresponding to a newly received echo signal for said last-named target takes place simultaneously.

* * * * *